July 31, 1956     H. J. HOFFMAN     2,756,515
ALPHABET ORDER
Filed Oct. 25, 1954
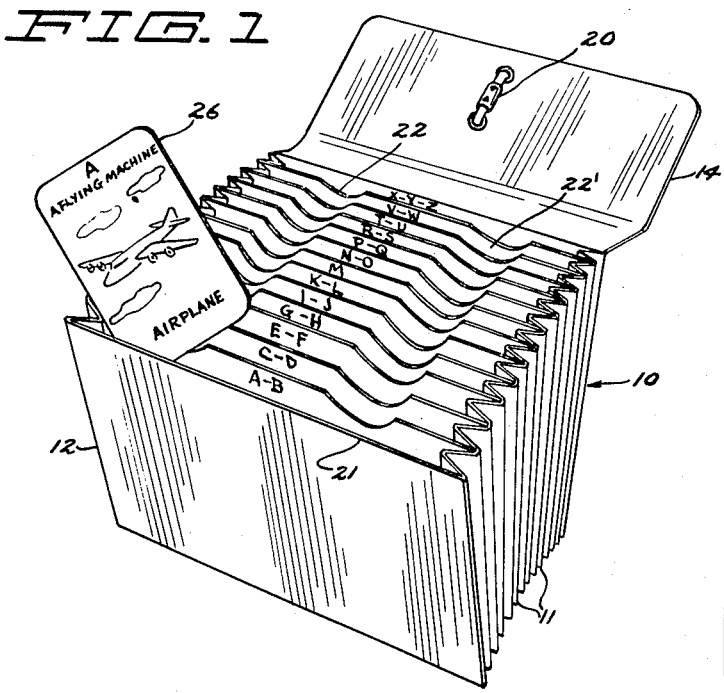
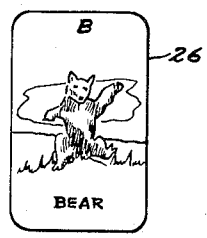
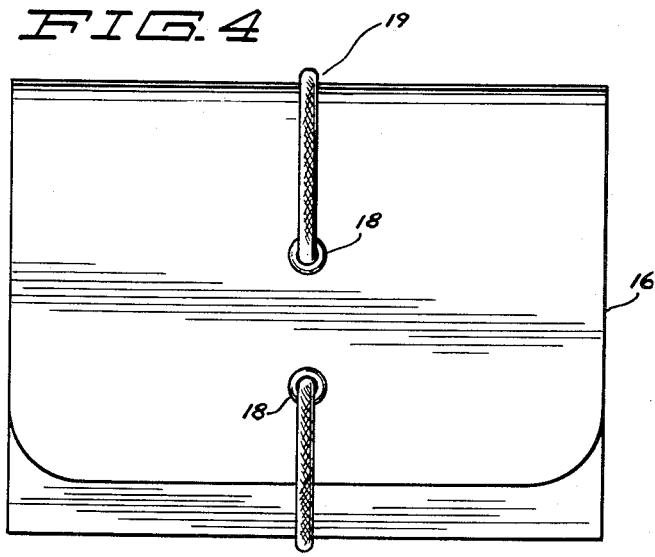
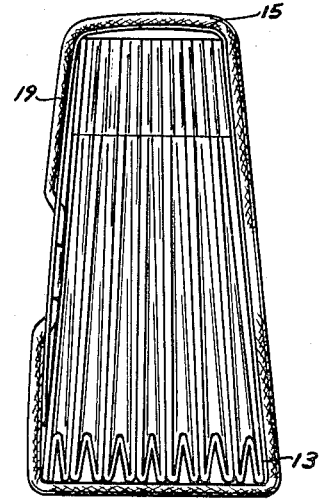
INVENTOR.
HAROLD J. HOFFMAN
BY
*Paul, Moore & Dugger*
ATTORNEYS

United States Patent Office 2,756,515
Patented July 31, 1956

2,756,515

ALPHABET ORDER

Harold J. Hoffman, Hastings, Minn., assignor to The Smead Manufacturing Company, Hastings, Minn., a corporation of Minnesota Application October 25, 1954, Serial No. 464,341

2 Claims. (Cl. 35—35)

This invention relates to a new and improved educational game for children. More particularly, this invention relates to a game for teaching children the alphabet, the essentials of alphabetical filing, and according to the specific embodiment of the invention selected, a variety of factual information which lends itself readily to alphabetical classification. This information may include meanings of words; famous personages in history, government, science and the arts; geographical areas; historical events and places; peoples of the world; animals; flowers, birds and the like.

The principal object of this invention is to provide an educational game comprising a file folder having a plurality of alphabetically indexed pockets and a plurality of cards bearing alphabetical indicia adapted to be inserted in the pockets of the file folder.

Another object of this invention is to provide an educational game comprising a file folder having a plurality of alphabetically indexed pockets and a plurality of cards bearing alphabetical indicia adapted to be inserted in the pockets of the file folder in which the cards carry additional factual data and/or illustrations which lend themselves to alphabetical classification.

A further object of this invention is to provide a new and improved educational game comprising a neat, compact accordion-fold type expanding file folder having a plurality of alphabetically indexed pockets and a plurality of cards adapted to be inserted in the pockets of the file folder, each card bearing a different key alphabetical index letter and additional factual information and/or illustrations which lend themselves to alphabetical classification according to the key letters.

Other objects of this invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the drawings, wherein the same numerals are used to designate corresponding parts and in which:

Figure 1 is a perspective view of the game of this invention shown open for insertion of the cards into the pockets;

Figures 2 and 3 are illustrative of two embodiments of different types of cards which may be used in this invention;

Figure 4 is a front elevation of the game of this invention showing the file folder closed; and Figure 5 is an end elevation of the folder shown in Figure 4.

Broadly stated, this invention consists of a game comprising an expanding file folder having a plurality of alphabetically indexed pockets arranged in alphabetical order therein and a plurality of cards adapted to be inserted in the pockets, each card bearing a key alphabetical letter, symbol or word corresponding to the individually indexed pockets. The expanding file folder is of the accordion-fold type, and for convenience, is preferably of the small or wallet size. Similarly, for convenience, the individual cards may be about playing card size or smaller. It is contemplated that each card will be different and there be sufficient cards to provide at least one card for each letter of the alphabet.

Referring now to the drawings and particularly to Figure 1, there is here shown in perspective view the game elements comprising this invention. The game includes an expanding file folder indicated generally at 10. As is well known in the folder arts, folder 10 is provided with a plurality of accordion folds or pleats 11 at both ends and the bottom, so as to permit expansion and contraction of the folder. The folder is provided with a front wall 12 and a back wall 13 (Figure 5). A flap portion 14 comprised of a connecting top wall portion 15 and a flap 16 are joined to the back wall 13. Flap 16 and top wall 15 are of variable widths, depending upon the thickness of the file folder. Flap portion 14 is preferably formed integral with back wall 13 and is preferably scored transversely at spaced intervals (longitudinally of the file folder) to permit varying the width of the top wall 15 and the width of flap 16 to accommodate different degrees of expansion of the file. It will be understood that as the file folder becomes expanded and top wall 15 becomes wider, the width of flap 16 becomes narrower by a corresponding amount.

The wallet type file folder comprising part of this invention includes a novel closure device as follows: Flap 16 of the folder is provided with two holes spaced apart along a line intermediate of the side edges of the flap. The holes are preferably provided with grommets 18 for strength. The ends of an extensible member, such as an elasticized cord 19, are inserted through grommets 18 and fastened together by any suitable clip means 20 forming a loop which can readily be stretched around either end of the file folder to hold it closed neatly, as shown in Figures 4 and 5.

The length of elastic cord 19 is such that when the folder is empty, the tension of the cord is sufficient to hold the folder compressed and flat. When the folder is filled and expanded, the cord is under relatively greater pressure and still holds the file folder closed, neat and compact. Cord 19 is sufficiently elastic that it may readily be slipped around the ends of the file folder, whether it is empty or in its expanded form. When the folder is open, the elastic loop cannot become lost or misplaced, since it is permanently looped through the holes in flap 16.

The top edge 21 of front wall 12 of the folder is preferably cut straight, but the individual dividers 22 which form the pockets 22' are desirably provided with indentations to facilitate removal of cards. Dividers 22 are provided with indexing literary indicia for each pocket, the distribution of the indexing indicia depending upon the number of pockets in the folder. Representative examples of cards 26 are shown in Figures 1, 2 and 3. The cards in Figures 1 and 3 have a key indexing letter, a definition of an object, a pictorial illustration of that article and its name. The card in Figure 2 is somewhat similar, but omits the definition. It will be readily apparent that a large variety of different cards may be devised directed to many different fields of interest. The only limiting consideration is that the type of material reproduced upon the card lend itself readily to alphabetical classification. The complexity of the factual information is determined by the level of intelligence of the age group to which the game is directed. The variety of subject matter which may be treated in a game of this kind is virtually unlimited.

While intended primarily for use by a child playing alone, the game is also adapted for use by groups of two or more. The child using the game becomes familiar with the alphabet and elemental alphabetical filing, in addition to repeated exposure to the factual information reproduced on each card. In this manner the child absorbs a wealth of useful information, as well as being contentedly diverted and occupied for hours at a time.

In addition to its educational and entertainment values the file of this invention is equally well adapted to more utilitarian purposes. One of this is as a sales tool. For example, the several pockets may be indexed for sales items or sales classifications. Thus, an automobile salesman's file would contain classifications such as motor, body styles, finishes, upholstery and the like. In the pocket designated motor would be cards containing motor specifications, size, horsepower and the like; the finish pocket contains cards showing the various colors and color combinations; the body style pocket contains cards showing dimensions and specifications of the various bodies, and so on.

The foregoing detailed description has been given for clearness of understanding only, and no unnecessary limitations should be understood therefrom.

What I claim is:

1. A game comprising an expanding file folder having accordion pleated side walls and an accordion pleated bottom, a plurality of index separators joined to the accordion pleats of said side walls and said bottom and providing a plurality of pockets in said folder, a plurality of cards for insertion in said pockets, said separators being provided with alphabetical indicia from front to back in the folder and said cards being provided with corresponding alphabetical indicia, there being at least one alphabetical card for insertion in each one of the pockets, a top flap secured to the file folder for covering the tops of each of said pockets and a resilient loop member secured to said folder and adapted to be moved from a first to second position, only a portion of said resilient loop member engaging said folder when in first position and said resilient loop member when in second position circumscribing said folder and said flap to substantially immovably position said flap over said top.

2. The structure of claim 1 in which said flap is provided with a pair of spaced apertures and said resilient loop is secured therein.

References Cited in the file of this patent

UNITED STATES PATENTS

| | | |
|---|---|---|
| 195,248 | Austin | Sept. 18, 1877 |
| 303,519 | Jenkins | Aug. 12, 1884 |
| 554,574 | Bennett | Feb. 11, 1896 |
| 585,397 | Ordway | June 29, 1897 |
| 1,560,994 | Jones | Nov. 10, 1925 |
| 1,585,237 | Doughty | May 18, 1926 |
| 1,698,841 | Doughty | Jan. 15, 1929 |
| 1,745,249 | Doughty | Jan. 28, 1930 |
| 1,755,853 | Waring | Apr. 22, 1930 |